US006025548A

United States Patent [19]

Ehrlich

[11] Patent Number: 6,025,548

[45] Date of Patent: Feb. 15, 2000

[54] COLLAPSIBLE STRINGED INSTRUMENT

[76] Inventor: Raymond Seth Ehrlich, 41-21 Morgan St., Little Neck, N.Y. 11363

[21] Appl. No.: 09/035,117

[22] Filed: Mar. 5, 1998

[51] Int. Cl.[7] ....... G01D 3/00

[52] U.S. Cl. ....... 84/291; 84/267; 84/293

[58] Field of Search ....... 84/291, 293, 267, 84/290

[56] References Cited

U.S. PATENT DOCUMENTS

| | | | |
|---|---|---|---|
| 2,464,100 | 3/1949 | Ruggiero | 84/275 |
| 2,803,982 | 8/1957 | Gassin et al. | 84/275 |
| 3,215,021 | 11/1965 | Kester, Jr. | 84/411 |
| 4,073,211 | 2/1978 | Jorgensen | 84/293 |
| 4,191,085 | 3/1980 | Litwin | 84/293 |
| 4,573,391 | 3/1986 | White | 84/291 |
| 4,686,882 | 8/1987 | Shaw | 84/291 |
| 5,058,479 | 10/1991 | Shaw | 84/291 |
| 5,353,672 | 10/1994 | Stewart | 84/291 |
| 5,383,385 | 1/1995 | Gilbert | 84/267 |
| 5,390,578 | 2/1995 | Raymer | 84/291 |
| 5,442,986 | 8/1995 | Cot | 84/267 |

*Primary Examiner*—Robert E. Nappi
*Assistant Examiner*—Kim Lockett
*Attorney, Agent, or Firm*—William C. Crutcher

[57] ABSTRACT

A collapsible acoustic guitar has a body divided into upper and lower halves, a detachable neck and a detachable string assembly consisting of headstock with tuning pegs, strings and an anchor member. In the preferred version, the upper body half nests in the lower body half and holds the neck and string assembly. In another version, the upper half is hinged to the lower half. The anchor member is used with a tensioning clamp and pivoting handle to loosen the strings for removal of the headstock and to tension the strings when the guitar is re-assembled.

16 Claims, 5 Drawing Sheets

COLLAPSIBLE STRINGED INSTRUMENT

This invention relates generally to stringed instruments which are adapted for assembly and disassembly for ease of transport, and more particularly to a collapsible guitar.

BACKGROUND OF THE INVENTION

A common problem with stringed instruments is the difficulty of transporting them from place to place. Stringed instruments, such as guitars, have a long neck member with exposed strings extending from the body of the instrument and are susceptible to damage during transportation. This requires the use of large carrying cases to prevent damage and the resulting package is bulky and unwieldy. In order to solve this problem, others have proposed guitars and other stringed instruments which can be folded or collapsed into smaller packages for ease of transport. A number of patents describing such constructions are summarized below.

U.S. Pat. No. 2,464,100 issued Mar. 8, 1949 to Ruggiero discloses a collapsible base fiddle having a body which separates into two sections along a vertical median plane into a right hand section and a left hand section. One body section may be nested within the other body section and a separate reinforced neck member with strings attached may be carried within the nested sections.

U.S. Pat. No. 2,803,982 issued Aug. 27, 1957 to Gassin et al. discloses a disassemblable bass violin with a detachable neck member having the strings attached to tuning pegs on one end and having the other ends of the strings anchored to a bar and buckle arrangement held in the lower end of the case by a peg.

U.S. Pat. No. 4,073,211 issued Feb. 14, 1978 to Jorgensen shows a collapsible guitar with a hinged neck which folds into a recess in the underside of the guitar body. To untension and disconnect the strings so as to fold the neck, a common bridge unit is removed from one spring clamp on the bottom of the guitar body and relocated to a second spring clamp, so that the neck may fold while the strings are still attached to the tuning pegs.

U.S. Pat. No. 4,191,085 issued Mar. 4, 1980 to Litwin illustrate a stringed musical instrument whose neck is detachable from the body of the instrument and is reversed and inserted into a hole to locate the tuning pegs inside the case while the strings are still attached.

U.S. Pat. No. 5,353,672 issued Oct. 11, 1994 to Stewart shows an electric guitar with a detachable neck held in place by a quick release neck clamp.

U.S. Pat. Nos. 4,686,882 and 5,058,479, both issued to Shaw on Aug. 18, 1987 and Oct. 22, 1991 respectively, show acoustic guitars with folding collapsible bodies. The collapsible bodies have wing panels which are moveable to reduce the size of the guitar body. The latter U.S. Pat. No. 5,058,479 has a removable neck member which is stored inside a collapsed reinforced guitar body and a tuning peg head which may be removed from the neck. The strings must be separately loosened and removed from a permanently affixed saddle and then re-attached and tuned when the guitar is assembled.

U.S. Pat. No. 5,390,578 issued Feb. 21, 1995 to Raymer, and U.S. Pat. No. 5,383,385 issued Jan. 24, 1995 to Gilbert illustrate additional variations of collapsible guitars having hinges to reduce the overall size of the instrument.

U.S. Pat. No. 4,573,391 issued Mar. 4, 1986 to White illustrates a guitar with various components to be assembled and attached to an inflatable bladder which supports the guitar body.

The foregoing patents illustrate various approaches to designing a stringed instrument with special structures adapted to reduce the size of the instrument. It would be desirable to have an improved stringed instrument which quickly breaks down into easily transportable size and shape, yet which can be quickly assembled and played without excessive time to assemble and tune the instrument. It would also be desirable to provide further improvements in collapsible guitars which allow quick assembly and disassembly without affecting the sound qualities of the instrument or requiring complicated structures.

Accordingly one object of the invention is to provide an improved stringed instrument which is easy and quick to assemble and disassemble.

Another object of the invention is to provide an improved collapsible guitar.

Still another object of the invention is to provide an improved stringed instrument which requires minimum time to assemble and tune the instrument.

Yet another object of the invention is to provide a collapsible guitar which occupies a space not much larger than one half of the normal guitar body.

SUMMARY OF THE INVENTION

Briefly stated, the invention is practiced by providing a stringed instrument adapted for assembly and disassembly for ease of transport, comprising an instrument body comprising a plurality of body sections including at least an upper body section having an upper face surrounded by a first peripheral wall and a lower body section having a lower face surrounded by a second peripheral wall, the body sections being adapted for connecting together so as to define a cavity, an elongated neck member arranged for attachment at a fixed end thereof to the instrument body and having an opposite free end extending away from the instrument body when attached and adapted to fit substantially inside at least one of the body sections when not attached, and a string assembly comprising a headstock with a plurality of tuning pegs and adapted for attachment to the free end of the neck member, an anchor member having a string attachment bar, and a plurality of strings each connected between one of the tuning pegs and the string attachment bar, the string assembly being foldable to a size to fit substantially inside at least one of the body sections, and tension clamp means for attaching the anchor member to the instrument body and adapted to exert a tensioning force on the string assembly.

In a first preferred embodiment, the upper section peripheral wall nests inside the lower section peripheral wall, and the peripheral walls have abutting skirts which are connected by closing means such as spring latching clamps. The anchor member and tensioning clamp are attached together as a unit, and the tensioning clamp is adapted for connecting to the upper body section.

In a second embodiment of the invention, the upper and lower body sections are pivotably connectable by hinge means. The anchor member is separate from the tensioning clamp, which is permanently attached to the guitar body.

DRAWINGS

The invention will be better understood by reference to the following description, taken in connection with the accompanying drawings, in which:

FIG. 1 is an exploded perspective view of a collapsible guitar, illustrating the major components, FIG. 2 is a bottom plan view of the upper body section of the disassembled guitar body, FIG. 3 is a top plan view of the upper body section shown in FIG. 2, FIG. 4 is a top plan view, partly in section, of the headstock and guitar neck illustrating one method of attachment of the headstock to the guitar neck, FIG. 5 is an end elevational view of the upper body section, looking in the direction of the arrows V—V of FIG. 3 and illustrating one method of attachment of the neck to the guitar body, FIGS. 6 and 7 are perspective views of the anchor member and tensioning clamp in open and closed positions, respectively, according to a preferred embodiment of the invention, FIG. 8 is an elevational view in cross section of a portion of the guitar lower body section illustrating a preferred spring latching clamp, FIG. 9 is a similar view to FIG. 8, showing a portion of the assembled guitar body sections, FIG. 10 is a view similar to FIG. 8, showing a portion of the disassembled and nested guitar body sections, FIG. 11 is a perspective view of an assembled collapsible guitar according to a second embodiment of the invention, FIG. 12 is a perspective view of the FIG. 11 guitar body in disassembled condition, opened but arranged for transport, FIG. 13 is an end elevational view of the FIG. 11 guitar, and FIGS. 14 and 15 are perspective views of an alternate form of anchor member and tensioning clamp in open and closed positions respectively.

DESCRIPTION OF THE PREFERRED EMBODIMENT

Figure 1:
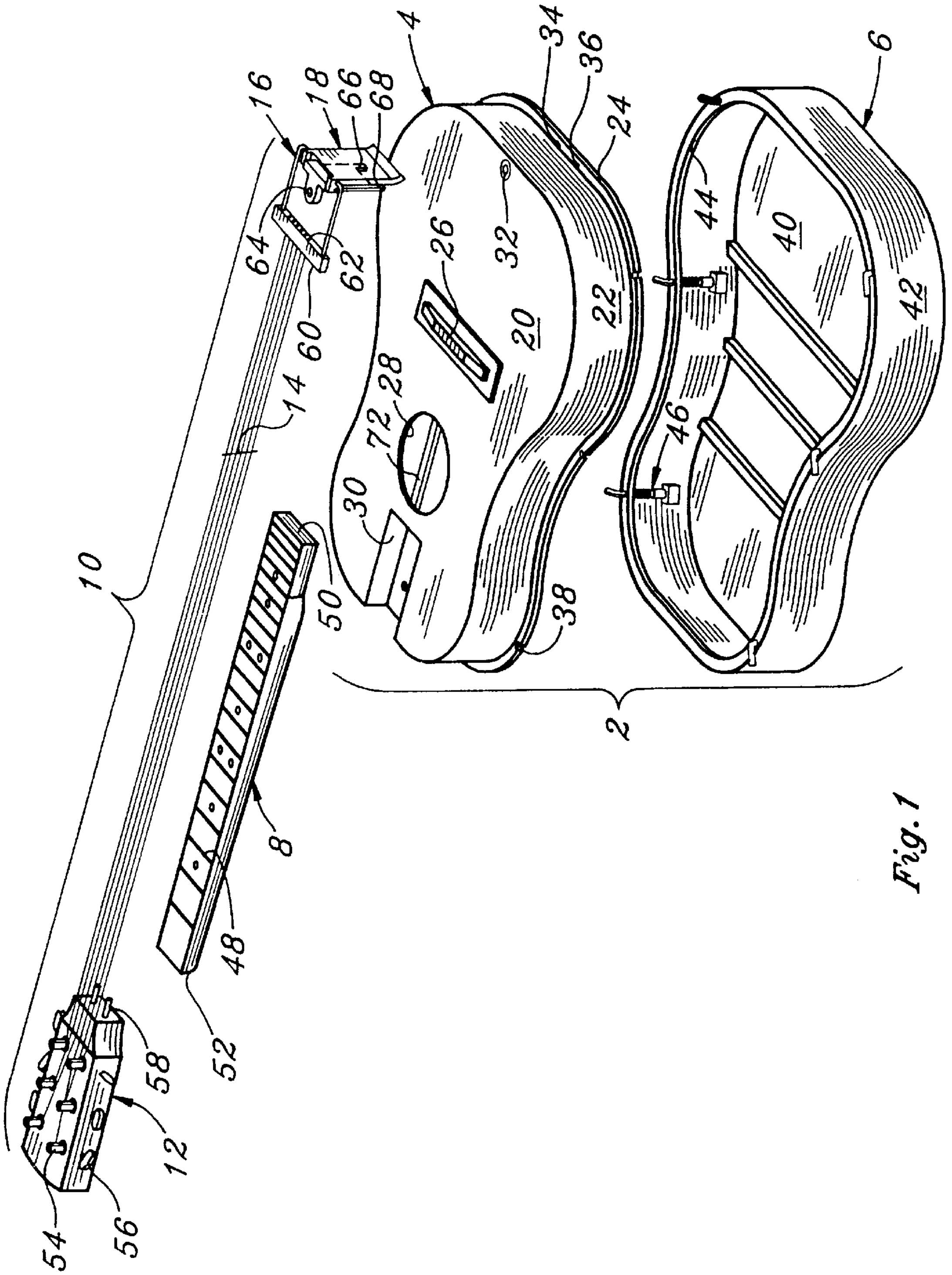

The preferred embodiment of the invention is shown in FIGS. 1–10. Referring now to FIG. 1 of the drawing, a collapsible is illustrated comprising an instrument body 2 made up of an upper body section 4 and a lower body section 6. The upper and lower body sections 4 and 6 fit together to form a substantially enclosed sound cavity. The other two major components are a guitar neck 8, and a separate string assembly 10. String assembly 10, in turn, is made up of a headstock 12, guitar strings 14, and an anchor member 16. A tensioning clamp 18 is combined with anchor member 16 in the preferred embodiment, but the tensioning clamp 18 can be separate therefrom as will be illustrated in a modification of the invention to be described later.

The upper body section 4 is made up of an upper face 20 surrounded by a peripheral wall 22. Peripheral wall 22 follows the contour of a conventional guitar, but is of a height slightly less than half of the normal height of such a peripheral wall on a conventional guitar body. Along the lower open edge of peripheral wall 22, a peripheral skirt 24 extends outwardly at right angles to wall 22. A bridge 26 is attached to the upper face 20 to elevate the guitar strings from the body and to separate them from one another above a sound opening 28, as in a conventional guitar.

In order to attach the guitar neck 8 to the guitar body, a rectangular recess 30 is provided on one end of the upper body section. On the other end of the upper body section, in order to attach the tensioning clamp 18 to the guitar body, a receptacle 32 is provided in the face 20 and a pair of receptacles 34, 36 are formed in skirt 24. Additional notches 38 are peripherally spaced around skirt 24 as part of the guitar body attachment mechanism to be described.

The lower guitar body section 6 is made up of a lower face 40 and a peripheral wall 42. Peripheral wall 42 follows substantially the same contour as peripheral wall 22 and is symmetrical therewith, but has an overall slightly larger dimension so that the upper peripheral wall 22 will fit inside the lower peripheral wall 42. Along the upper open edge of peripheral wall 42 is a peripheral skirt 44, is which is directed inwardly at right angles to wall 42. A number of spring latching clamps 46 are peripherally spaced around the wall 42 on the inside to be described later in detail.

Figure 4:
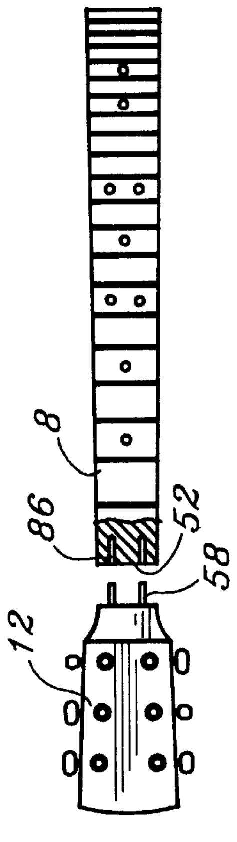

Referring now to the guitar neck member 8, it is seen to be an elongated member equipped with conventional frets 48 and having one end 50 adapted to be fixed within the recess 30 and a free end 52 adapted to receive the headstock 12. Headstock 12 includes six conventional rotatable tuning pegs 54 which are respectively rotated by turning thumb screws 56 connected to gears on the tuning peg spindles via a worm gear connection (not shown) as is well known in the art. Headstock 12 is provided with two attachment pegs 58. FIG. 4 illustrates the method of attaching headstock 12 to the free end 52 of guitar neck 8. Free end 52 is provided with a pair of holes 86 having brass bushings therein dimensioned to receive the pegs 58 protruding from the headstock, as will be apparent from the drawing.

Referring back to the string assembly 10, and particularly the anchor member 16, strings 14 are attached to a string attachment bar 60 by virtue of extending through individual holes 62 in the attachment bar. Anchor member 16 and the integrated tensioning clamp 18 are attachable to the upper body section 4 by means of a push button locking connector 64 to be described, which cooperates with receptacle 32, and a pair of lower pegs 66, 68, which fit in receptacles 34, 36 respectively on the peripheral skirt 24.

Figure 3:
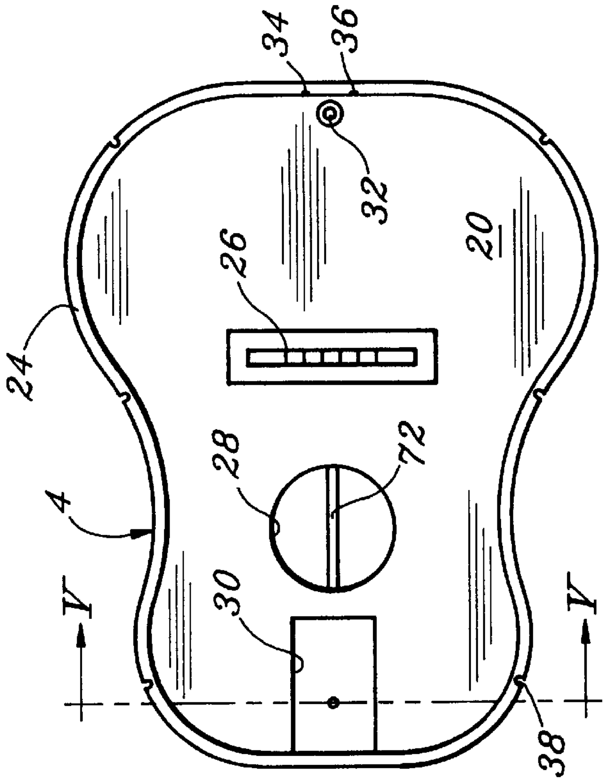
Figure 2:
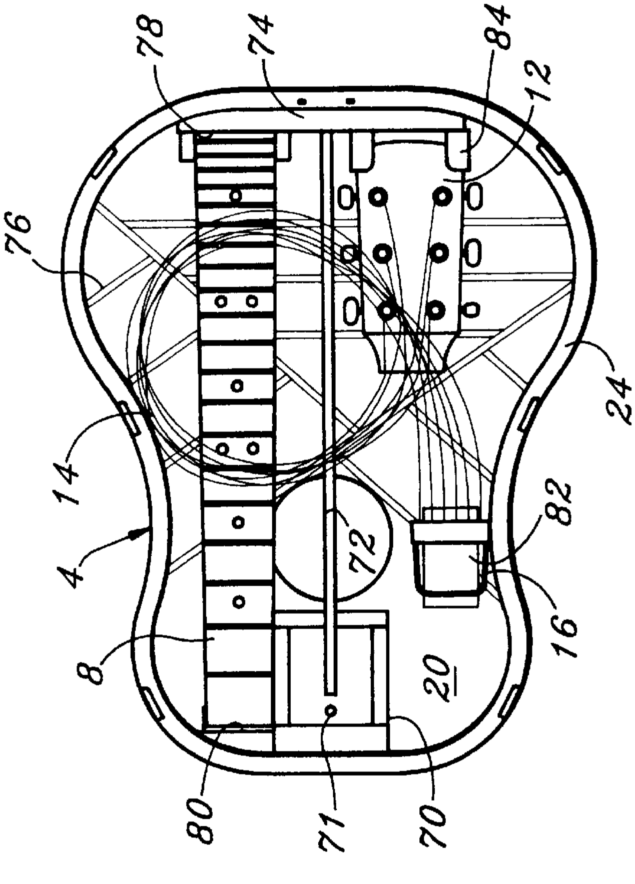

Referring to FIG. 2 of the drawing, a bottom plan view of the upper body section 4 is seen when inverted from the position shown in FIG. 1, while FIG. 3 shows a top plan view. Construction details include a reinforced box 70 making up the guitar neck receiving recess 30, and a major reinforcing truss member 72 extending longitudinally along the body section to a reinforcing block 74 on the opposite end. The guitar neck is secured within recess 30 by means of a thumb screw 71. Truss member 72 serves to prevent buckling when tension is applied to the guitar strings. A number of secondary reinforcing strips 76 criss-cross the top face on the underside thereof.

Figure 5:
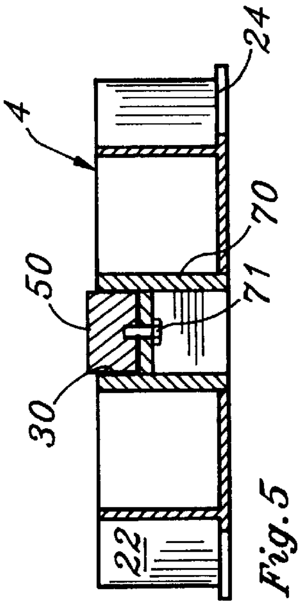

FIG. 5 illustrates the attachment of the fixed end 50 of guitar neck 8 to the upper body section 4. A thumb screw 71 extending through a section of reinforcing box 70 serves to tighten the fixed end 50 within the recess 30 and hold it securely in place. In accordance with the present invention, the string assembly 10 is separate from the neck member 8, so that it may be folded or coiled to fit inside the guitar body along with the guitar neck 8 and to be stowed there for transport. A first pair of opposite receptacles 78 and 80 having elastomeric inserts serve to stow the guitar neck 8. A receptacle 82 and a receptacle 84 receive the anchor member 16 (with attached tensioning clamp 18), and the headstock 12 respectively. The guitar strings 14 are coiled, so that the entire string assembly fits within the upper body section 4.

Figure 6:
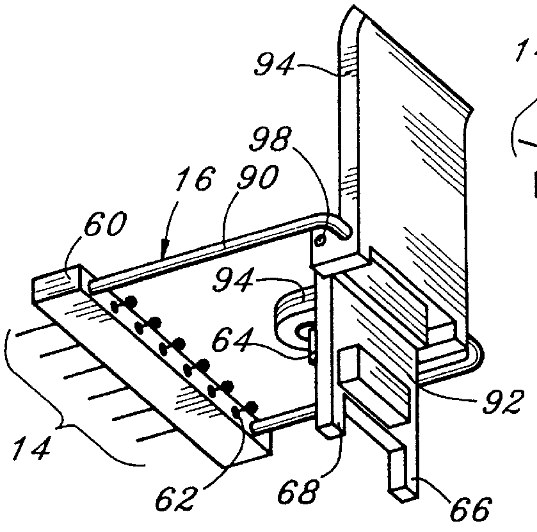
Figure 7:
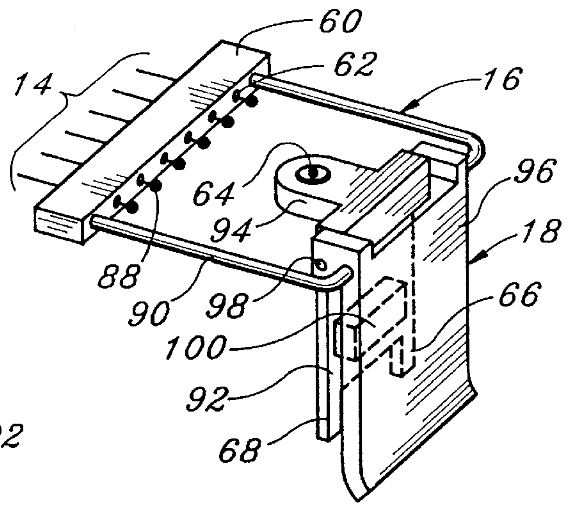

Referring to FIGS. 6 and 7 of the drawings, anchor member 16 and clamp 18 are shown in open and closed position respectively. Guitar strings 14 are securely held in the string attachment bar 60 by virtue of each string extending through one of the holes 62 in the attachment bar 60 and being provided with an enlarged grommet 88 in conventional fashion. A steel rod 90 on each end of bar 60 pivotally attaches anchor 16 to the tensioning clamp 18. Tensioning clamp 18 is made up of an attachment plate 92 with the aforementioned pegs 66, 68 and a flange 94 carrying the aforementioned push button locking device 64. A suitable commercially available locking device is available under the registered trademark STRAPLOCK® comprising a four ball lock on a recessed plunger which snaps to lock and releases when the push button is actuated. Other suitable attachment systems are also commercially available. A tensioning clamp handle 96 is pivotably attached at 98 to the attachment plate 92. The ends of rods 90 are received in opposite sides of clamp handle 96 close to the pivot points, so that by rotating clamp handle 96, from the position shown in FIG. 6 to the position shown in FIG. 7, the string attachment bar 60 will move closer to the attachment plate 92, thereby placing a tensioning force on the string assembly. A plastic cushioning block 100 arrests the movement of the clamp handle 96 at the proper position.

Figure 8:
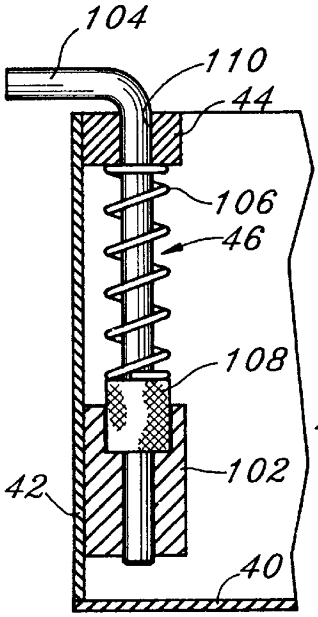
Figure 9:
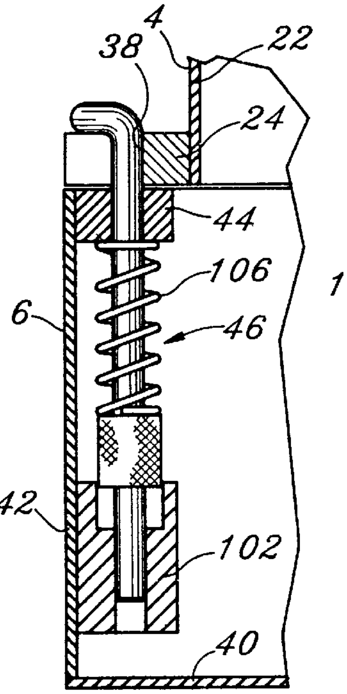
Figure 10:
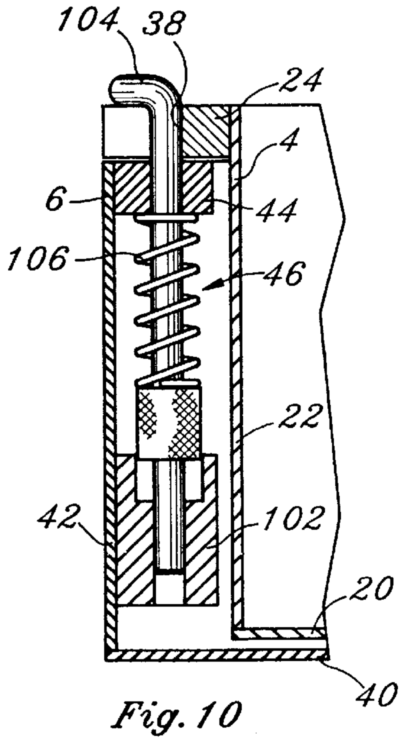

Referring now to FIGS. 8, 9 and 10 of the drawing, the details of the spring latching clamps 46, which are used to connect the guitar body sections 4 and 6 together may be seen in various modes of operation. The spring clamps are mounted in blocks 102 spaced around the interior of peripheral wall 42. Referring to FIG. 8, each clamp includes an L-shaped rod 104, a compression spring 106 and a bushing 108. Rods 104 extend through suitable holes 110 in the peripheral skirt 44. In FIG. 9, the upper body section 4 is placed on the lower body section 6 with skirts 24 and 44 abutting one another. This is the assembled guitar body mode. The notches 38 in upper skirt 24 register with rods 104 on the spring clamps so that they may be pulled outward against the force of compression spring 106 and turned to clamp the guitar body sections together.

While the latching clamps 46 are described in detail, the type of closing means used are not a material part of the invention. Other closing means could be used, such as hooks, thumbscrews, VELCRO®, etc. without departing from the scope of the invention.

In FIG. 10, illustrating the transport and stowage mode the upper body section 4 has been inverted and placed within the lower section 6. Skirt 24 rests on top of skirt 44 to support the inverted upper body section. The rods 104 are shown pulled out against the force of compression spring 106 and twisted within notches 38 to a position to hold the two sections securely for transport.

In this manner, the size of the entire package of the preferred embodiment, assembled for transport with the guitar neck 8 and foldable string assembly 10 stowed within the upper section as seen in FIG. 2 and with the upper and lower sections nested as seen in FIG. 10, is very compact. It is no larger than the outside contours of a conventional guitar body (without the attached neck and headstock), and the thickness of the collapsed guitar body is only slightly more than half the thickness of the assembled thickness of the body, i.e., the thickness of a conventional guitar.

MODIFICATION

A modified form of the invention is seen by reference to FIGS. 11 through 15.

Figure 11:
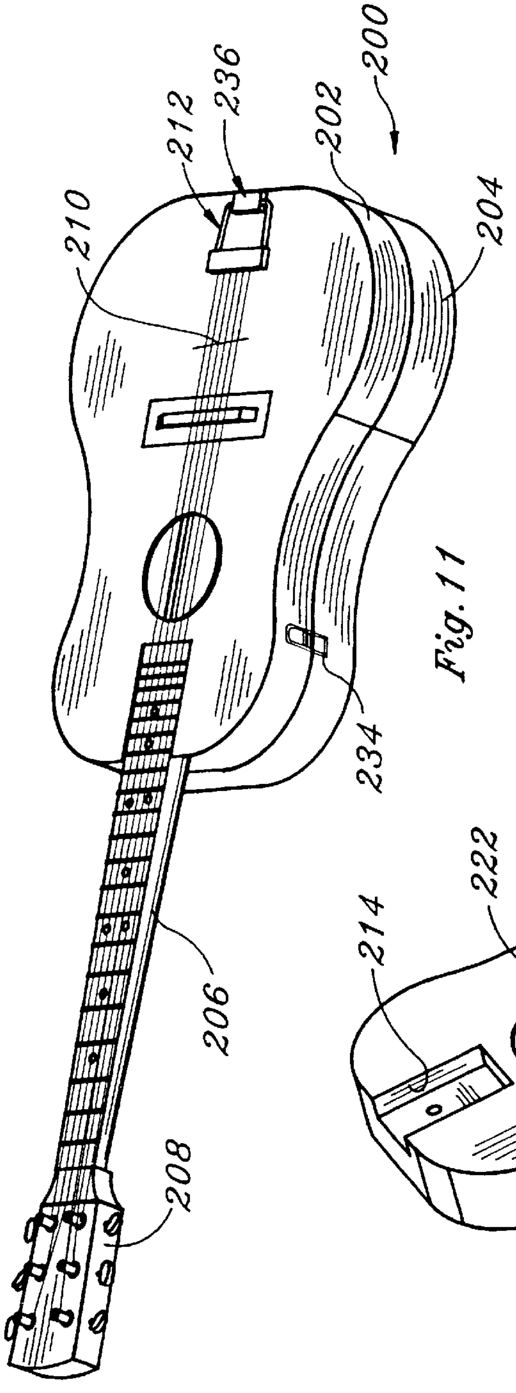
Figure 12:
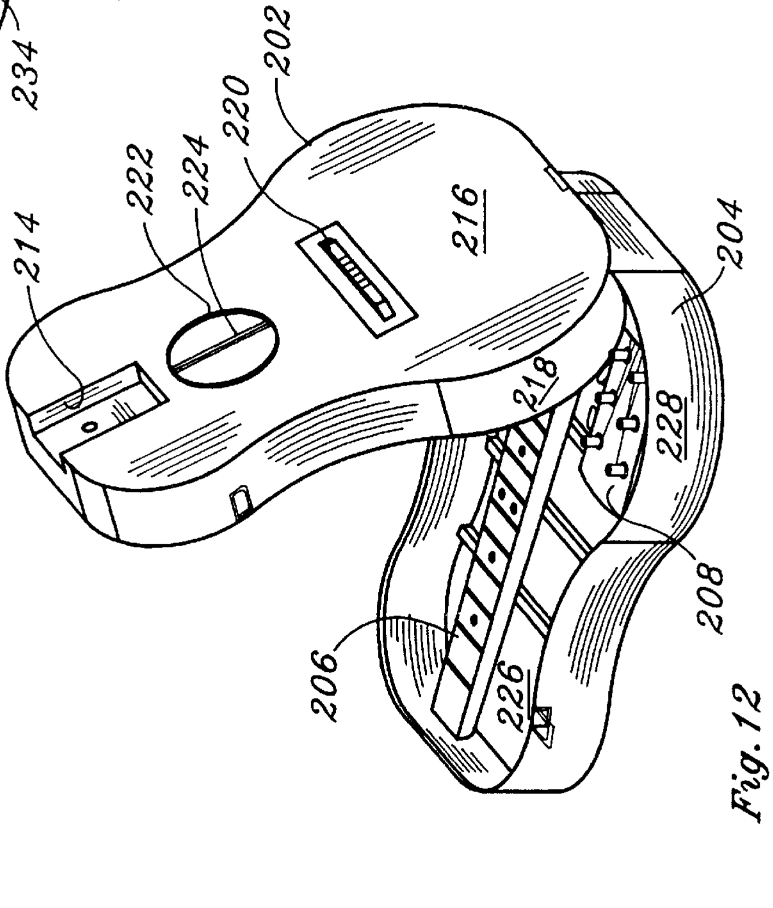
Figure 13:
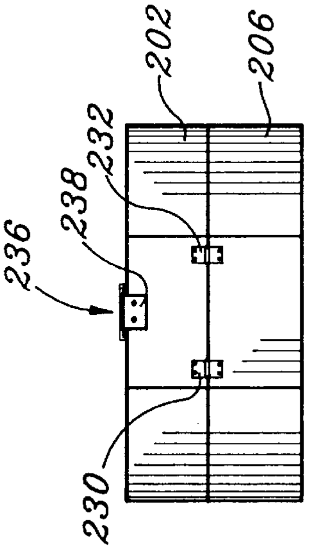

Referring to FIGS. 11, 12 and 13, a guitar body 200 includes an upper body section 202 and a lower body section 204, a detachable guitar neck 206 and a separable string assembly comprising a headstock 208, strings 210, and anchor member 212. The guitar neck 206 has a fixed end which is detachably mounted in a suitable recess 214 in the upper body section 202 by which may be constructed as previously described (see FIG. 12). Upper body section 202 comprises an upper face 216 surrounded by a peripheral wall 218, equipped with sound bridge 220, sound opening 222 and a reinforcing truss rod 224 which may be constructed as previously described. A tensioning clamp 236 is permanently attached to the upper body section 202. The lower section 204 comprises a lower face 226 surrounded by a peripheral wall 228, which is approximately the same size and shape as upper peripheral wall 218.

One difference between the modified embodiment of FIGS. 11–15 and that of FIGS. 1–10 is that in the modification, the upper and lower body sections are pivotably connectable by hinges, rather than nested inside one another. The modified version is essentially the same in concept as the preferred version, inasmuch as both open laterally (i.e., separate around the periphery of the body) and both have the string assembly and neck stored inside. As seen best in FIG. 13, a pair of hinges 230, 232 on the butt end of the guitar body allow it to be opened, while a pair of latches (one shown at 234) similar to a latch on an attache case allow the two halves to be securely fastened together. Of course, other types of hinge means could be employed to provide a pivotable connection, including the type of hinge which may be separated by sliding in a lateral direction. Similarly other types of latching means could be employed, such as VELCRO®.

In this modification, the guitar neck 206 and the foldable string assembly (headstock 208, strings 210 and trapeze 212) may be stowed within the lower body section 204 in suitable receptacles as before.

Another difference between this embodiment and the one previously described is that the tensioning clamp 236 is separate from the anchor member 212. The tensioning clamp is permanently attached to the upper body section 202 by screws 238 as best seen in FIG. 13. Details of the anchor member 212 and the tensioning clamp 236 may be seen by reference to FIGS. 14 and 15.

Figure 14:
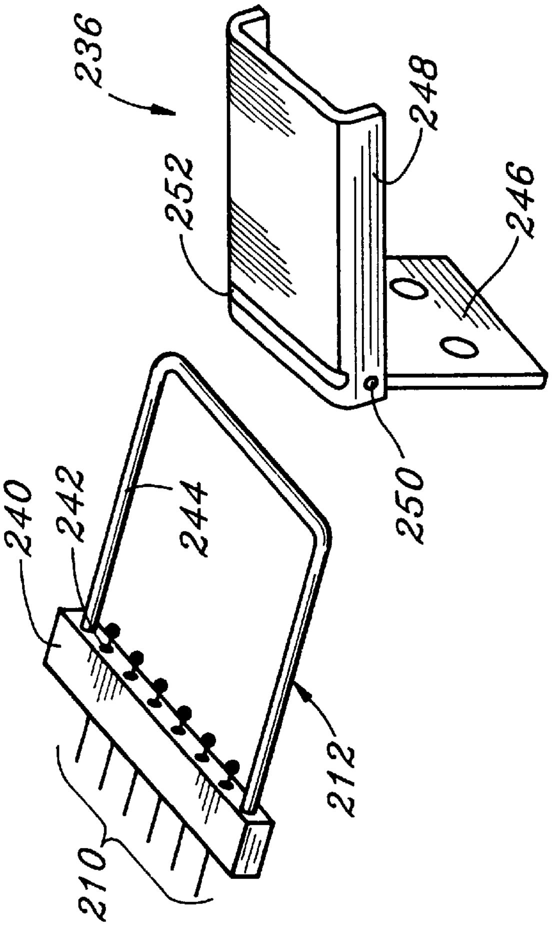

The anchor member 212 comprises a string attachment bar 240 with holes 242 to receive the guitar strings 210 as before. A U-shaped rod 244 attached to opposite ends of string attachment bar 240 completes the anchor member 212 which remains a part of the string assembly. The tensioning clamp 236 comprises an attachment bracket 246 which is permanently attached to the guitar upper body section as shown in FIG. 13. Pivotably attached thereto is a clamp handle 248 by virtue of a pair of pivot pins 250. A lateral groove 252 in the top of clamp handle 248 is dimensioned to receive the cross bar or mid-section of the U-shaped piece 244 when in the open position (FIG. 14). Rotation of clamp handle 248 places tension on the anchor member 212 and on the string assembly as the handle is moved to the closed position (FIG. 15).

Figure 15:
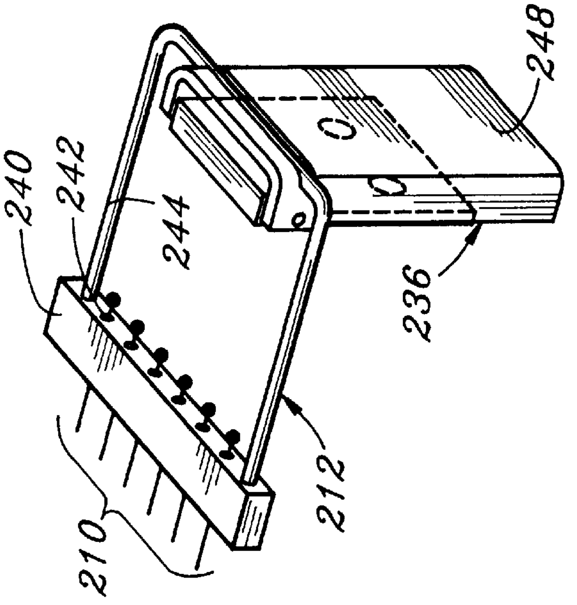

While the integral anchor member and tensioning clamp 16, 18 previously described in FIGS. 6 and 7 are shown in connection with the preferred embodiment of the invention, and the separate anchor member 212 and tensioning clamp 236 described in FIGS. 14 and 15 are shown in connection with the modified form of the invention, they are thus shown only for convenience. It is possible to use the separate anchor and clamp with the nested guitar body, or to use the unified form of anchor and clamp with the hinged version of the guitar body.

Similarly, there are alternative methods of attachment of the guitar neck to the guitar body, such as dovetail connections or clamping devices similar to those shown in the prior art. The particular method of attachment of the guitar neck is not a material aspect of the present invention.

Similarly, there are alternative methods of attachment of the headstock to the guitar neck, the two pegs shown in the description being only a preferred method. Alternative methods of attachment are shown in the prior art and are not material to the present invention.

While the guitar body is shown made up of upper and lower body sections, it is also possible to have one or more intermediate body sections, the body sections all being adapted for connection together to define the sound cavity. Each of the body sections may be larger than the next so as to be nested, providing an even smaller package when disassembled for storage.

OPERATION

The guitar is disassembled by first releasing the tension on the string assembly by moving the clamp handle on the tensioning clamp to the unclamped position and then either disengaging the trapeze from the clamp (FIG. 14), or by operating the special locking device 64 to remove the unitary trapeze and tensioning clamp from the guitar body. The string assembly is then removed from the guitar neck (FIG. 4) and the guitar neck is removed from the guitar body (FIG. 5). The upper and lower body sections are separated and the guitar neck and foldable string assembly are stowed in the lower body section (FIG. 12) or in the upper body section (FIG. 2) depending on the version employed. In the preferred embodiment, the upper section is then nested within the lower body section and the spring latching clamps are operated to latch the upper section in place (FIG. 10). Alternatively, in the hinged version, the body is simply closed and latched (FIG. 12).

In assembling the guitar the reverse procedure is followed. A particularly advantageous aspect of the invention, is that the tuning pegs are never disturbed and upon retensioning the strings with the clamping member, it will be found that the guitar is substantially already in tune and requires very little attention, if any, to retune it. This is in contrast to many of the prior art constructions which require replacement of the strings when the stringed instrument is reassembled.

While the invention is shown in connection with a guitar, it will be apparent that many other types of stringed instruments, particularly those of the type having a large cavity in the instrument body, are suitable for the invention. Such instruments include most of the well-known types of portable stringed instruments.

While there has been described what is considered to be the preferred embodiment of the invention and one modification thereof, it is desired to secure in the appended claims all such modifications as fall within the true spirit and scope of the invention.

I claim:

1. A stringed instrument adapted for assembly and disassembly for ease of transport, comprising:

an instrument body comprising a plurality of body sections including at least an upper body section having an upper face surrounded by a first peripheral wall and a lower body section having a lower face surrounded by a second peripheral wall, said body sections including closing means for connecting said body sections together so as to define a cavity, an elongated neck member arranged for attachment at a fixed end thereof to said instrument body and having an opposite free end extending away from the instrument body when attached and dimensioned so as to fit substantially inside of at least one of said body sections when not attached, a string assembly comprising a headstock having a plurality of tuning pegs and having means for attachment of the headstock to the free end of the neck member, an anchor member having a string attachment bar, and a plurality of strings each connected between one of the tuning pegs and the string attachment bar, said string assembly being foldable to a size to fit substantially inside at least one of said body sections, and tensioning clamp means for attaching the anchor member to the instrument body and including means for exerting a tensioning force on the string assembly.

2. The combination according to claim 1, wherein said first peripheral wall is substantially the same shape as, but smaller than the second peripheral wall, whereby the upper body section may be inverted and nested within the lower body section.

3. The combination according to claim 2, wherein the upper body section includes a first peripheral skirt extending from the first peripheral wall and wherein the lower body section includes a second peripheral skirt extending from the second peripheral wall, said first and second peripheral skirts being substantially co-extensive so as to abut one another.

4. The combination according to claim 1, wherein the upper body section is pivotally connectable to the lower body section by at least one hinge means, and having at least one latching means to hold the body sections together.

5. The combination according to claim 1, wherein said tensioning clamp means is connected to the anchor member so as to form a part of the string assembly.

6. The combination according to claim 1, wherein said tensioning clamp means is attached to the instrument body and includes a portion arranged to engage the anchor member of the string assembly.

7. The combination according to claim 1, wherein the tensioning clamp means includes an attachment member having a locking device for attachment to the upper body section and a handle pivotally connected to the attachment member, the handle being also pivotally connected to the anchor member so as to move the anchor member when the handle is pivoted.

8. The combination according to claim 1, wherein the stringed instrument is a guitar.

9. A guitar adapted for assembly and disassembly for ease of transport, comprising:

a guitar body comprising a plurality of body sections including at least an upper body section having an upper face surrounded by a first peripheral wall and a lower body section having a lower face surrounded by a second peripheral wall, the upper body section being dimensioned to permit inverting and nesting inside the lower body section, an elongated neck member arranged for attachment at a fixed end thereof to the upper body section and having an opposite free end extending away from the guitar body when attached, and dimensioned so as to fit substantially inside of the upper body section when not attached, a string assembly comprising a headstock having a plurality of tuning pegs and having means for attachment to the free end of the neck member, an anchor member having a string attachment bar, and a plurality of strings each connected between one of the tuning pegs and the string attachment bar, the string assembly being foldable to a size to fit inside the upper body section, and tensioning clamp means for attaching the anchor member to the guitar body and including means for exerting a tensioning force on the string assembly.

10. The combination according to claim 9, wherein the first peripheral wall includes a first peripheral skirt extending outwardly therefrom and wherein the second peripheral wall includes a second peripheral skirt extending inwardly therefrom, the first and second peripheral skirts arranged to abut one another.

11. The combination according to claim 10, including at least one spring latching clamp disposed within the peripheral wall of the lower body section and arranged to latch the first peripheral skirt against the second peripheral skirt.

12. The combination according to claim 9, wherein the tensioning clamp means is connected to the anchor member and forms a part of the string assembly, the tensioning clamp means being adapted for temporary attachment to the upper body section.

13. The combination according to claim 12, wherein the tensioning clamp means comprises an attachment member including a locking device for attachment to the upper body section, and a clamping handle pivotally attached to the attachment member, said clamping handle being also pivotally attached to the anchor member.

14. The combination according to claim 9, wherein the tensioning clamp means comprises an attachment member attached to the upper body section and a clamping handle pivotally attached to the attachment member, the clamping handle having a portion arranged to engage the anchor member portion of the string assembly.

15. The combination according to claim 9, wherein the upper body section includes a box arranged to receive the fixed end of the neck member, a support plate in the opposite end of the upper body section, and a truss support rod extending between the support plate and the box for preventing buckling of the upper body section when the string assembly is tensioned.

16. The combination according to claim 9, wherein the upper body section includes a plurality of elastomeric receptacles adapted to yieldably receive the fixed and free ends of the elongated neck member, the headstock, and the anchor member so as to hold them in place during transport.

* * * * *